United States Patent [19]

Kanamori

[11] Patent Number: 4,775,559
[45] Date of Patent: Oct. 4, 1988

[54] DECORATIVE ARRANGEMENT

[75] Inventor: Hiroshi Kanamori, Yokohama, Japan

[73] Assignee: Nissan Motor Company, Limited, Japan

[21] Appl. No.: 777,631

[22] Filed: Sep. 19, 1985

[30] Foreign Application Priority Data

Oct. 5, 1984 [JP] Japan ................................ 59-208098

[51] Int. Cl.⁴ ...................... B60R 13/04; G09F 21/04
[52] U.S. Cl. ...................................... 428/31; 40/591; 40/594
[58] Field of Search .................... 428/31; 40/910, 591, 40/594; 280/762

[56] References Cited

U.S. PATENT DOCUMENTS

| | | | |
|---|---|---|---|
| 2,205,466 | 6/1940 | Caprio et al. | 156/219 |
| 3,772,810 | 11/1973 | Kupperman et al. | 428/31 X |
| 3,914,482 | 10/1975 | Sawa et al. | 428/31 |
| 3,973,342 | 8/1976 | Gubela | 428/31 |
| 4,066,285 | 1/1978 | Hall et al. | 428/31 X |
| 4,101,698 | 7/1978 | Dunning et al. | 428/31 |
| 4,154,880 | 5/1979 | Drennan | 428/38 |
| 4,172,331 | 10/1979 | Becker | 428/31 X |
| 4,238,340 | 12/1980 | Markley et al. | 264/257 X |
| 4,275,099 | 6/1981 | Dani | 428/31 |
| 4,342,613 | 8/1982 | O'Leary et al. | 428/420 X |
| 4,349,592 | 9/1982 | Nussbaum | 428/31 |
| 4,446,179 | 5/1984 | Waugh | 428/31 |
| 4,481,160 | 11/1984 | Bree | 428/13 X |
| 4,520,053 | 5/1985 | Marentic | 428/31 |
| 4,556,588 | 12/1985 | Rockwood | 428/542.2 X |

FOREIGN PATENT DOCUMENTS

| | | | |
|---|---|---|---|
| 929984 | 7/1973 | Canada | 428/31 |
| 1204543 | 11/1965 | Fed. Rep. of Germany | 428/31 |
| 58-34207 | 3/1983 | Japan | 428/31 |
| 59-96029 | 6/1984 | Japan | 428/31 |
| 439883 | 12/1935 | United Kingdom . | |
| 757542 | 9/1956 | United Kingdom . | |
| 861933 | 3/1961 | United Kingdom . | |
| 1018696 | 2/1966 | United Kingdom | 428/31 |
| 1090590 | 11/1967 | United Kingdom . | |
| 1275305 | 5/1972 | United Kingdom . | |
| 1318532 | 5/1973 | United Kingdom | 428/31 |
| 1483226 | 8/1977 | United Kingdom . | |
| 1493103 | 11/1977 | United Kingdom . | |
| 2149180 | 6/1985 | United Kingdom . | |

Primary Examiner—Henry F. Epstein
Attorney, Agent, or Firm—Leydig, Voit & Mayer

[57] ABSTRACT

A decorative arrangement for a vehicle, such as a motor car or a ship, includes a transparent resin main body and a decorative member at least partially spaced from and covered by the main body. Adhesive bonds the main body and the decorative member. After the bond is completed, the adhesive remains flexible. The deformable adhesive prevents unwanted deformation of and damage to the main body and the decorative member even if the main body and the decorative member are made of materials having different coefficients of thermal expansion.

17 Claims, 4 Drawing Sheets

DECORATIVE ARRANGEMENT

BACKGROUND OF THE INVENTION

1. Field of the Invention

This invention relates to a decorative arrangement.

2. Description of the Prior Art

The rear end of some automotive vehicles has a decorative aluminum plate on which the vehicle's name or the maker's name is written. The decorative plate is usually bonded by means of double-sized adhesive tape to the outer surface of a vehicle rear finish molding made of transparent material, such as acrylate resin. In these arrangements, since the decorative plate is exposed, it is easy to damage and its color tends to fade. Since the decorative plate and the finish molding which are bonded together by the adhesive tape are made of materials having different coefficients of thermal expansion, the resin molding is liable to deform and damage.

Improved arrangements further include a transparent member covering the decorative plate. Since the decorative plate and the cover are usually separated by a relatively wide space, their opposing surfaces to either side of the space are sometimes subject to condensation.

Japanese Utility Model Publication 58-34207 discloses a vehicular light including spaced inner and outer lenses.

SUMMARY OF THE INVENTION

It is an object of this invention to provide a durable decorative arrangement.

In accordance with this invention, a decorative arrangement includes a transparent resin main body and a decorative plate or member which are at least partially spaced from and bonded together by means of adhesive. The adhesive being flexible and the decorative member having means to retain adhesive.

BRIEF DESCRIPTION OF THE DRAWINGS

Like elements are denoted by like reference characters throughout the drawings.

DESCRIPTION OF THE PREFERRED EMBODIMENTS

Figure 1:
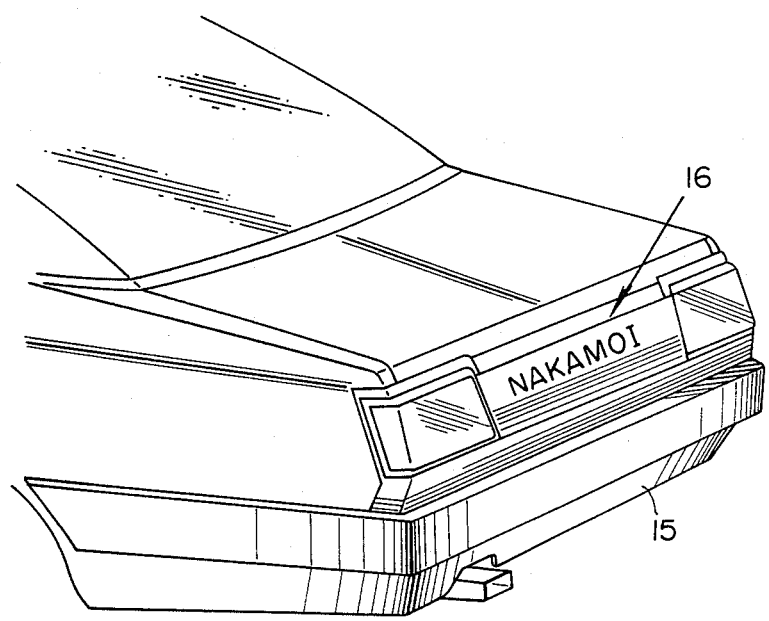
FIG. 1 is a perspective view of the rear end of an automotive vehicle including a decorative arrangement according to a first embodiment of this invention.
Figure 2:
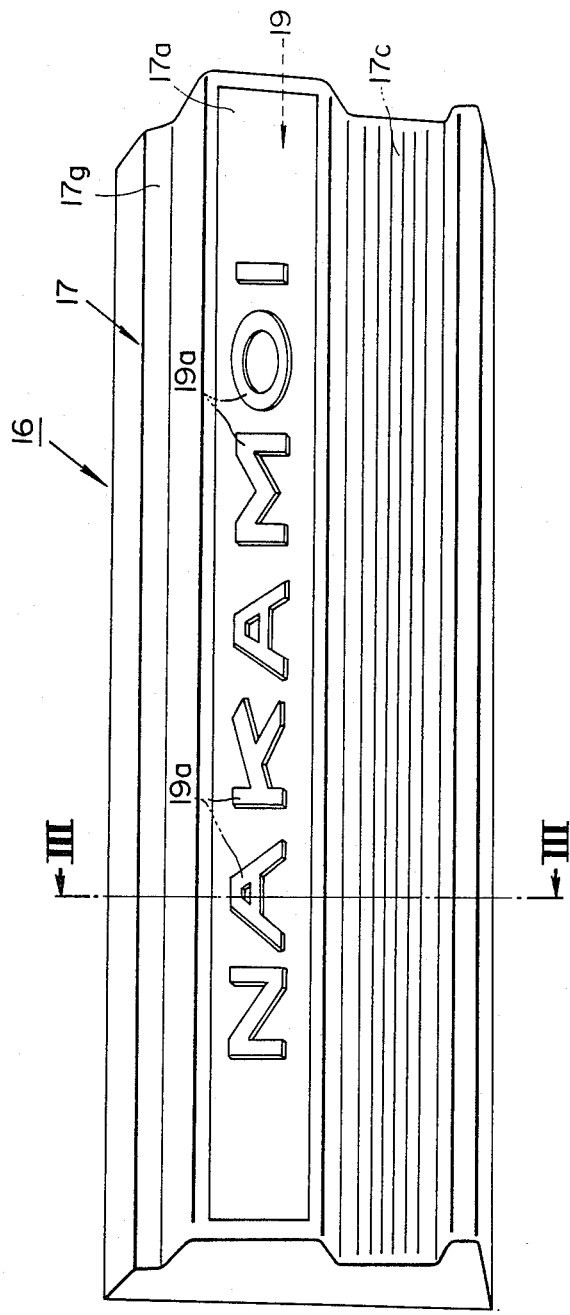
FIG. 2 is an enlarged perspective view of the decorative arrangement of FIG. 1.
Figure 3:
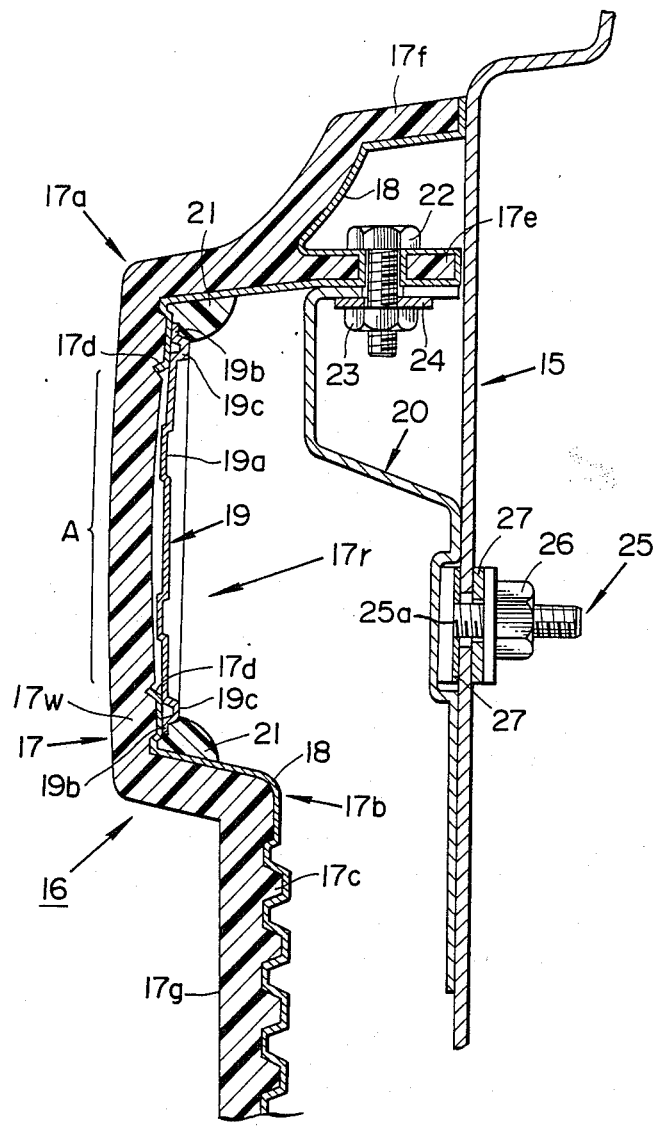
FIG. 3 is a cross-section of the decorative arrangement taken along line III—III of FIG. 2.

With reference to FIGS. 1 to 3 showing a first embodiment of this invention, an automotive vehicle body has a rear panel 15 to which a rear finish 16 is attached.

The rear finish 16 includes a main body 17 attached to the vehicle rear panel 15 via a bracket 20, which will be described in more detail hereinafter. The finish main body 17 extends outward of the vehicle rear panel 15. A decorative plate 19 mounted on the finish main body 17 extends along or overlies an area of inner surface 17b of the finish main body 17 as described in more detail hereinafter. The rest of the inner surface 17b of the finish main body 17 is covered with coating 18 of a predetermined color.

The finish main body 17 is a transparent molding made of resin, such as acrylate resin. The finish main body 17 is in the form of an approximately rectangular tray having a section 17a projecting outward, that is, projecting from the rear of the vehicle. The section of the inner surface 17b of the finish main body 17 below the projection 17a has a corrugated structure 17c formed by a series of parallel grooves and protrusions extending transversely with respect to the vehicle body.

The projection 17a is hollow. In other words, the finish main body 17 has an inside recess 17r extending into and bounded by the projection 17a. The projection 17a has an outermost rectangular wall 17w lying parallel to the vehicle rear panel 15 and defining a rectangular bottom or depth of the recess 17r. The inner surface of the outermost wall 17w has a groove 17d of V-shaped cross-section which extends along a rectangle lying slightly inward of edges of the bottom or depth of the recess 17r. The coating 18 fixedly covers the inner surface 17b of the finish main body 17 lying outside the rectangular area A bounded by the groove 17d. The decorative plate 19 extends along or overlies the area A of the inner surface 17b bounded by the groove 17d. The edges 19b of the decorative plate 19 project outside of the area A bounded by the groove 17d.

The decorative plate 19 is rectangular, substantially conforming to the bottom or depth of the recess 17r. The decorative plate 19 is made of aluminum having a coefficient of thermal expansion generally different from that of the material forming the finish main body 17. A character or characters 19a, such as letters spelling out the vehicle's name or the maker's name, are written on the decorative plate 19. The characters 19a are formed by press machining or die stamping, so that they are 3-dimensional. It should be noted that writing the characters 19a may also be performed by coloring or printing. The decorative plate 19 has a protrusion 19c projecting toward the vehicle rear panel 15 and extending throughout the edges 19b of the plate 19.

The edges 19b of the decorative plate 19 are bonded by means of a fluid-tight and flexible adhesive 21, such as urethane sealant, to the inner surface 17b of the finish main body 17 along the corners within the recess 17r defined by the vertical wall and the horizontal walls of the projection 17a. In this way, the adhesive 21 bonds the entire periphery of the decorative plate 19 to the finish main body 17. It should be noted that the corners within the recess 17r extended along the edges of the bottom or depth of the recess 17r. The word "fluid-tight" means that the adhesive 21 has hermetic and liquid sealing properties.

The adhesive 21 may also be of some other rubber-base resilient type, such as butyl or silicon based. The major part of the decorative plate 19 inside of its edges 19b is preferably separated from the inner surface of the outermost wall 17w of the projection 17a by a small gap or clearance whose minimal value is smaller than 2 millimeters.

The edges of the finish main body 17 have abutment segments 17f extending essentially perpendicular to the vehicle rear panel 15. The end faces of the abutment segments 17f contact the vehicle rear panel 15. The finish main body 17 also has attachment segments 17e lying inward of and parallel to the abutment segments 17f. The bracket 20 lies within the interior of the finish main body 17. Bolts 25 fastened to the vehicle rear panel 15 by nuts 26 and washers 27 have heads 25a bonded or welded to the bracket 20, whereby the bracket 20 is fixed to the vehicle rear panel 15. The attachment segments 17e are fastened to the bracket 20 by the combination of bolts 22, nuts 23, and washers 24, so as to secure the finish main body 17 to the vehicle rear panel 15. The attachment segments 17e are preferably spaced slightly from the vehicle rear panel 15 to ensure firm contact between the abutment segments 17f and the vehicle rear panel 15.

During manufacture of the rear finish 16, a masking member is inserted into engagement with the groove 17d in the finish main body 17 so as to cover the rectangular inner surface of the finish main body 17 bounded by the groove 17d. Then, the coating 18 is applied to the inner surface of the finish main body 17. After application of the coating 18, the decorative plate 19 is placed on the inner surface of the finish main body 17 so as to cover the non-coated rectangular surface of the finish main body 17 bounded by the groove 17d. While the decorative plate 19 is held in firm contact with the finish main body 17, the adhesive 21 is applied between the plate 19 and the body 17 to bond the plate 19 to the body 17. The protrusion 19c on the decorative plate 19 dams and retains the adhesive 21, facilitating and expediting application of the adhesive 21.

Since the finish main body 17 covers the decorative plate 19, the plate 19 is protected from damage and the color of the plate 19 is prevented from fading. Furthermore, the characters 19a can be seen through the transparent finish main body 17, resulting in a rear finish 16 with a high grade appearance.

Since the adhesive 21 remains flexible after bonding of the decorative plate 19 to the finish main body 17 is completed, these members 17 and 19 are prevented from damage due to relative deformation even as the two members expand and contract at different rates under temperature changes. In other words, the flexible design of the adhesive 21 prevents a build-up of stress in the main body 17 and the decorative member 19 due to the difference between their thermal expansion rates.

Since the gap between the finish main body 17 and the decorative plate 19 is small, the inner surfaces of these members 17 and 19 opposing each other across the gap will remain almost completely free of condensation. Furthermore, this small gap allows the members 17 and 19 to deform to the negligible extent necessary as the air trapped within the gap expands and contracts.

The corrugated structure 17c of the finish main body 17 produces a 3-dimensional pattern of transverse stripes in addition to the 3-dimensional characters 19a, enhancing the appearance of the rear finish 16.

Figure 4:
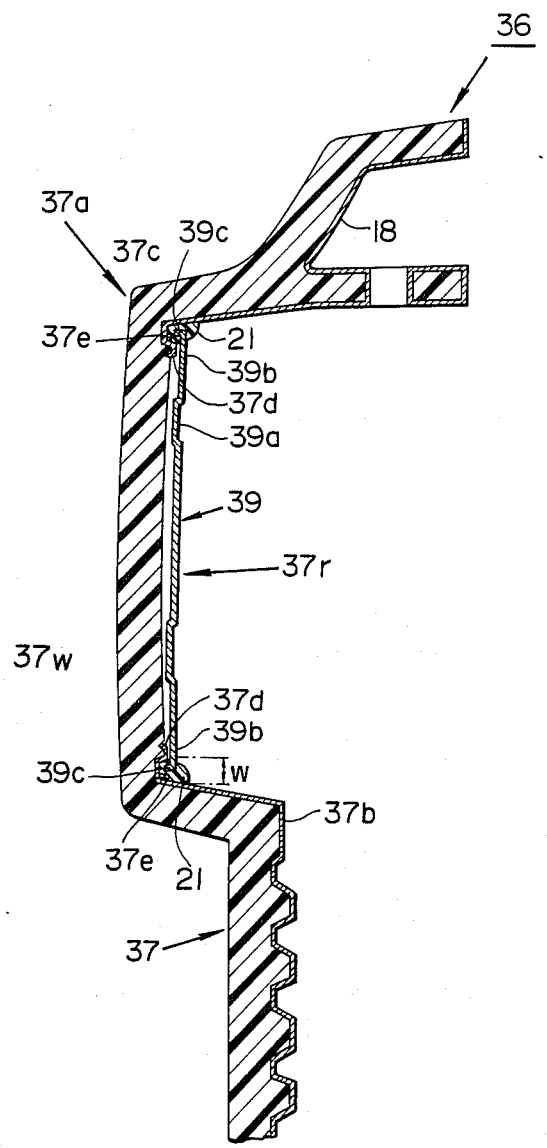
FIG. 4 is a cross-section similar to FIG. 3 and illustrates a decorative arrangement according to a second embodiment of this invention.

FIG. 4 shows a second embodiment of this invention. This embodiment is similar to the embodiment of FIGS. 1 to 3 except for the design changes described below.

As shown in FIG. 4, the inner surface of an outermost wall 37w of a projection 37a of a finish main body 37 has a groove 37e completely surrounding the rectangle bounded by a V-shaped groove 37d. Specifically, the groove 37e extends along the edges of the bottom or depth of a recess 37r within the projection 37a. The edges of a decorative plate 39 have flanges 39c bending outwards to extend into the groove 37e. Adhesive 21 filling the groove 37e bonds the flanges 39c to the finish main body 37. The width w of the groove 37e is chosen so as to compensate for any dimensional differences which may arise between the members 37 and 39 due to the difference between the thermal expansion rates of the members 37 and 39.

While the embodiments of FIGS. 1 to 4 are applied to the rear finish of an automotive vehicle, this invention is not limited to these applications. For example, this invention may be applied to other decorative arrangements related or unrelated to automotive vehicles or ships.

It should be noted that the coating 18 may be omitted from this invention.

What is claimed is:

1. A decorative arrangement comprising:
    (a) a transparent resin main body;
    (b) a decorative member at least partially spaced from and in facing relationship with an inner surface of the transparent main body; and
    (c) adhesive bonding the main body to the decorative member, the adhesive being flexible after the bonding is completed and the decorative member having means to retain adhesive.

2. The decorative arrangement of claim 1, wherein the adhesive is fluid-tight.

3. The decorative arrangement of claim 1, wherein the adhesive comprises urethane sealant.

4. The decorative arrangement of claim 1, wherein the transparent main body is made of acrylate resin.

5. The decorative arrangement of claim 1, wherein the decorative member is made of aluminum.

6. The decorative arrangement of claim 1, wherein the transparent main body has a projection and a recess within the projection, the projection having an outermost wall defining a bottom of the recess, the decorative member overlying an inner surface of the outermost wall.

7. The decorative arrangement of claim 6 wherein the decorative member substantially conforms to the bottom of the recess.

8. The decorative arrangement of claim 7, wherein the projection has corners along edges of the bottom of the recess, and wherein the adhesive bonds edges of the decorative member to these corners.

9. The decorative arrangement of claim 8, wherein the edges of the decorative member have a protrusion retaining the adhesive.

10. The decorative arrangement of claim 8, wherein the outermost wall of the projection has a groove extending along the edges of the bottom of the recess, the edges of the decorative member have a flange bending into the groove, and wherein the adhesive fills the groove.

11. A decorative arrangement comprising:
    (a) a transparent main body made of a material having a first coefficient of thermal expansion;
    (b) a decorative member at least partially spaced from and covered by the main body and made of a material having a second coefficient of thermal expansion different from the first coefficient of thermal expansion; and
    (c) flexible adhesive means bonding the transparent main body and the decorative member, wherein after the bonding between the transparent main body and the decorative member is completed, the adhesive means remains flexible and thus prevents a build-up of stress in the transparent main body and the decorative member due to the difference between the first and second coefficients of thermal expansion.

12. The decorative arrangement of claim 11, wherein the adhesive means is fluid-tight, and the adhesive means bonds the entire periphery of the decorative member to the transparent main body.

13. A decorative arrangement comprising:
(a) a vehicle panel;
(b) a transparent main body extending outward of the vehicle panel;
(c) means for attaching the transparent main body to the vehicle panel;
(d) a decorative member at least partially spaced from and overlying an inner surface of the transparent main body and being covered by the transparent main body; and
(e) adhesive means bonding the main body and the decorative member, the adhesive means being flexible after the bonding between the transparent main body and the decorative member is completed.

14. The decorative arrangement of claim 13, wherein the vehicle panel comprises an automotive vehicle rear panel.

15. The decorative arrangement of claim 13, wherein the adhesive means is fluid-tight, and the adhesive means bonds the entire periphery of the decorative member to the transparent main body.

16. The decorative arrangement of claim 13, further comprising a character written on the decorative member and visible through the transparent main body.

17. The decorative arrangement of claim 13, wherein peripheral portions of the decorative member are bonded by the adhesive means to the transparent main body and portions of the decorative member inward of peripheral portions are spaced from the transparent main body to define an air gap therebetween sealed by the adhesive means, said adhesive means providing a fluid-tight bond between the peripheral portions of the decorative member and the main member.

* * * * *